United States Patent
Tendler et al.

(10) Patent No.: US 8,516,451 B2
(45) Date of Patent: Aug. 20, 2013

(54) SYSTEM AND METHOD FOR CREATING VIRTUAL CALLBACK OBJECTS

(75) Inventors: Dov Tendler, Jerusalem (IL); Nitsan Amichai, Yahud (IL); Moshe Kraus, Mazkeret Batya (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1216 days.

(21) Appl. No.: 12/241,622

(22) Filed: Sep. 30, 2008

(65) Prior Publication Data

US 2009/0313603 A1 Dec. 17, 2009

Related U.S. Application Data

(60) Provisional application No. 61/061,526, filed on Jun. 13, 2008.

(51) Int. Cl.
*G06F 9/44* (2006.01)
(52) U.S. Cl.
USPC .......................... 717/131; 717/106; 717/134
(58) Field of Classification Search
USPC .................. 717/106–119, 124–135
See application file for complete search history.

(56) References Cited

U.S. PATENT DOCUMENTS

2007/0118559 A1* 5/2007 Christiansen et al. ..... 707/104.1

OTHER PUBLICATIONS

Mercury Interactive, "LoadRunnere®—Creating Vuser Scripts—Windows and Unix", Version 7.51, 2002, Mercury Interactive Corporation, pp. i-xvii, 1-48, 153-476, 531-552, 769-781.*
Bea, "Using RMI with Client-Side Callbacks", 2000, http://docs.oracle.com/cd/E13211_01/wle/rmi/callbak.htm, e-docs.bea.com, 13 pages.*
BeaWebLogic® Integration, "Capacity Planning and Performance Turning", Version 9.2, Nov. 2007, Bea Systems, 42 pages.*
Software Testing Stuff, "Vusers in LoadRunner", Aug. 2009, retrieved from http://www.softwaretestingstuff.com/2009/08/vusers.html, 3 pages.*

* cited by examiner

*Primary Examiner* — Ted T Vo (57) ABSTRACT

A method for creating a virtual callback object using a client callback object. A client device executes a client application. A client callback object is used by the client application in a client/server transaction between a server device and the client device. A recorder module captures the client/server transaction between the client device and the server device, and the client callback object is used in the client/server transaction. Internal client operations may be filtered from the client callback object to create the virtual callback object. A script may be generated using the virtual callback object.

14 Claims, 6 Drawing Sheets

SYSTEM AND METHOD FOR CREATING VIRTUAL CALLBACK OBJECTS

CROSS REFERENCE TO RELATED APPLICATIONS

This Application claims the benefit of U.S. provisional patent application Ser. No. 61/061,526, filed Jun. 13, 2008, titled "System And Method For Creating Virtual Callback Objects", which application is hereby incorporated by reference herein as if reproduced in full below.

BACKGROUND

With the availability of Internet and networking technology, businesses are able to use network communication as a means of distributing information about their businesses, advertising, and providing services to customers and potential customers. Not only can businesses distribute information and provide services over the Internet, but businesses may also use networked applications in order to provide external access to information within their company allowing efficient cooperation between co-workers, business units, and customers.

Networked applications can use a client/server or web application architecture to handle the communication between a provider of services called a server and a user of the services called a client. Whether the network applications on the networked system are used for internal use or available via the Internet, the operation of the applications which run upon the system are often tested to ensure that the applications function properly. Not only should the applications and systems respond properly to individual requests for information, but any network-available resource should also be capable of operating properly when being subjected to many simultaneous requests or multiple requests within a short duration of time. In addition, the speed with which the system, such as a web server, responds to requests as the number of requests or load upon the system increases may also be measured. Testing to determine the ability of a network system to respond under increasing amounts of traffic is referred to as load testing.

Load testing tools are often based on the concept of recording a client's activity for an application being tested, and then subsequently simulating load situations by duplicating and concurrently 'replaying' the activities to the server as if the activities were from real users. Some load testing tools enable the running of lightweight 'virtual users' (VUsers) or virtual clients in such a way that the server cannot distinguish between the virtual client and a real user running the application. The load testing tool may perform the load simulation by running multiple concurrent VUsers on one machine.

DETAILED DESCRIPTION

Alterations and further modifications of the inventive features illustrated herein, and additional applications of the principles of the inventions as illustrated herein which would occur to one skilled in the relevant art and having possession of this disclosure, are to be considered within the scope of the invention. The same reference numerals in different drawings represent the same element. The term "client/server" may be used interchangeability with "client-server."

Load testing may be performed against a networked computer system. Load testing can generally be used to test the correct functionality and responsiveness of a particular server, as well as to test the connections between the clients and the server. Because any test supplied to the server passes along the network, the network may be part of each test to the extent the network problems affect the responsiveness of the server. Testing can also be used to see if development changes have broken or impaired the networked applications. By analyzing the data produced during load testing, network related bottlenecks can be identified and separated from any problems associated with the operation of the server. The number of requests or overall load upon a server may continue to be increased until the server is unable to handle a further load or crashes.

Two types of emulation that may be used in client/server and web enabled applications include a playback technique and a simulated interface. Using a playback technique, a client may be emulated by recording and playing back a series of calls to the server that may be made by an actual client without running the full client process. The server can perform the same operations that would be performed if the requests were made by a real client. However, the client used to perform the playback may not need to do all of the local processing normally associated with typical server calls. Server calls may be sent at appropriate times and then the web client can respond as the server calls are received.

In the second emulation approach, the simulated interface (or simulated web client) may involve preparing an interface that would be used by a client to access the server, and then emulating the operation of the interface on the local system and allowing the calls which would be made via that simulated client interface to be made to the server. The simulated interface approach may involve actual emulation of the interface used by the client program, but the client may not execute the functions of displaying the interface to an actual user or other internal functions. Multiple simultaneous client processes may be emulated on a client device or load server using a simulated interface without displaying or operating a number of user-operable client processes on the web client, client interface, client device, or load server.

Load testing may use script generation mechanisms to create "virtual users" (VUsers) or virtual clients. Script repetition mechanisms are subsequently used to execute the scripts or threads for the virtual clients. Script generation may be called recording and script repetition may be called replaying. Virtual clients may replace a plurality of actual clients or client devices because running many actual client applications can use extensive resources on the client device for the client application instances. Virtual clients may be used in load testing to emulate a real client device using a minimal amount of resources. A virtual client should preserve all the communication with the server, server device, or server system and eliminate all the client specific operations or internal client operations, which consume client device resources.

Figure 1:
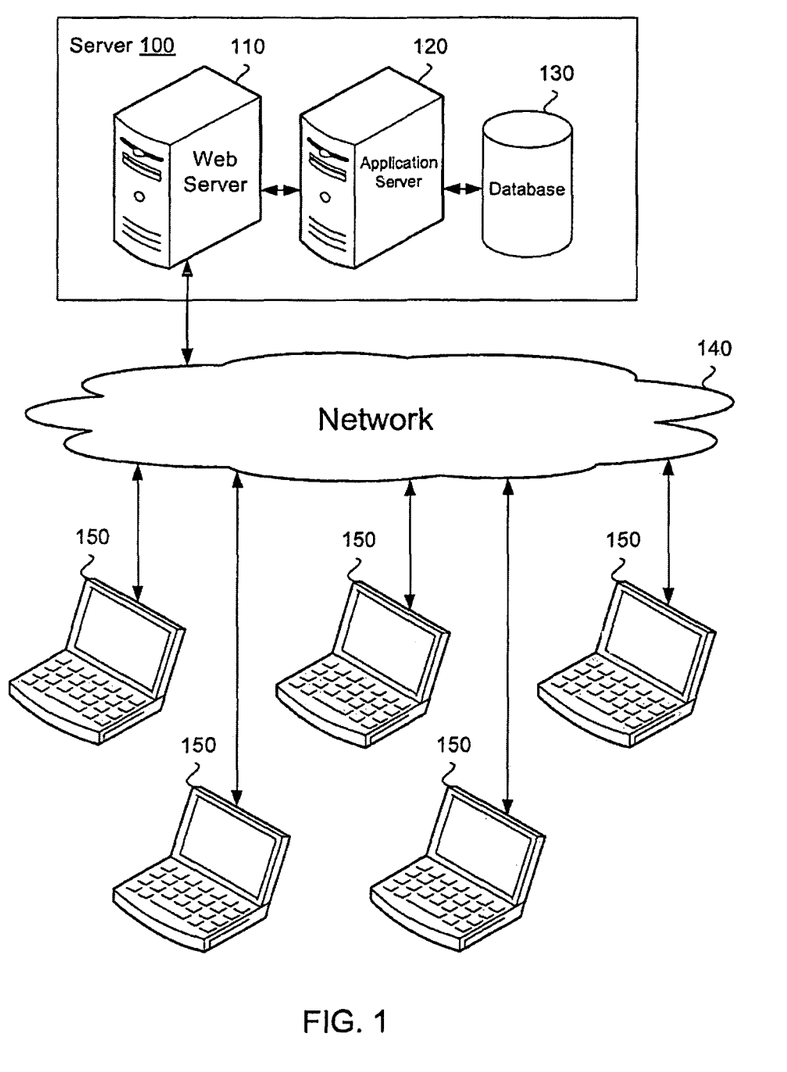
FIG. 1 is an illustration of a plurality of client devices coupled to a server using a network in accordance with an embodiment.

For example, a plurality of client devices 150 may communicate with a server 100 using a network 140, as illustrated in FIG. 1. A server application or client/server application may be computer software, firmware, hardware, or a combination thereof that runs on a server used across a network or the Internet to provide several clients with the application functionality on the client devices. The client application or client/server application may include a client interface.

The server 100 or hosting server(s) may provide the processing, databases, and resources used by the application. The server or server system may include a web server 110, an application server 120, a database 130, and other resources used to service clients. The web server may manage the communication between the application server and the client devices. The communication protocol between the client device and the web server may be Hypertext Transfer Protocol (HTTP) or another web protocol. The application server may run and process the requests of the client application.

The client device may be a personal computer, notebook computer, personal digital assistant (PDA), wireless device, mobile telephone, or similar device enabled to network with a server. The server may be enabled to service and host a plurality of clients or client devices. The client device may be considered a "thin client" (no local storage and no local processing), "fat client" (local storage and local processing), or "hybrid client" (local processing, but no local storage). For a thin client, the bulk of the processing and storage used for the client application is performed by the server (e.g., web client). For a fat client, the bulk of the processing and storage used for the client application is performed by the client device. For a hybrid client, the client device performs the bulk of the processing but relies on the server for storage data or other processing intensive operations. The network may be a Local Area Network (LAN), Wide Area Network (WAN), Internet, a corporate communication network, or other network used to connect a server to a client device.

The client may make a request of the server using the client application. The server may process the request and return a result. The client application may use a graphical user interface (GUI) application, web browser, web client, or other "thin client" that uses limited processing functionality in running the application, but which is enabled to send requests to the server and receive responses from the server.

The Java™ and .NET™ software development environments are popular protocols and languages used to develop networking and client/server applications. Java™, .NET™, Java™/.NET™-based software, or software with similar features may be used to develop, create, or implement client interfaces, client/server applications, and load testing mechanisms. The .NET Framework™ is a Microsoft™ development environment meant to improve and ease the development cycle for a large variety of applications implementing many different techniques and paradigms. Much like Java™, .NET™ offers a managed runtime environment that reduces the amount of detailed coding required by the developer and allows the developer to focus on the business value of the applications being developed.

Figure 2:
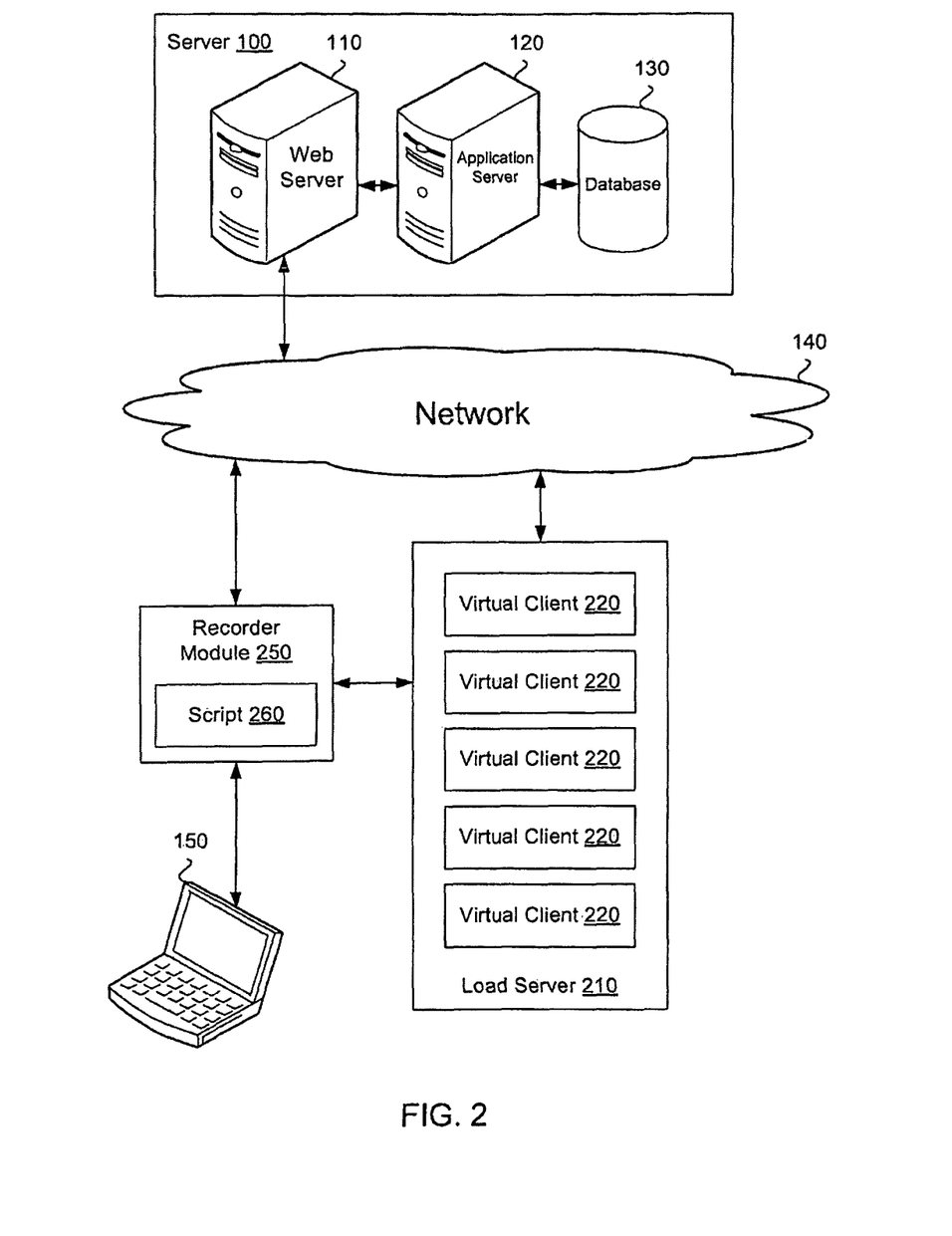
FIG. 2 is an illustration of a load server coupled to a server using a network in accordance with an embodiment.

A communication between a client device and a server may be called a transaction. Load testing mechanisms may receive method and function calls in the transaction between the client device 150 and the server 100 associated with a client application, as illustrated in FIG. 2. The activity or transaction may be captured by a recorder module 250. A "module" as used herein, may refer to any combination of software, firmware, or hardware used to perform the specified function or functions. The recorder module may be included within the client device or may be a separate system. The recorder module may record a series of transactions or a variety of transactions performed by a human tester through the client and this can generate a script 260 for use by virtual clients 220. Virtual clients may run on a client device or the plurality of virtual clients may run on a specialized client device called a load server 210 adapted to handle a multiplicity of virtual clients. The script generated by the recorder module including a least one client/server transaction may be loaded onto each client device or the load server. A plurality of client devices or load servers running or executing virtual client scripts or threads may be used in load testing a server.

A script may be a series of commands, operations, functions, methods, or instructions interpreted by the client that can be used to perform load testing on a server. The script may contain a plurality of threads representing each virtual client. Each virtual client contains a single thread or a plurality of threads. A thread of execution, sometimes referred to as a thread, is a means to split (or fork) a program or process into two or more simultaneously (or pseudo-simultaneously) running tasks. Pseudo-simultaneously running tasks may be processes that run in close succession to each other. Threads of a script may emulate a plurality of users accessing the same server at near simultaneous times.

In another embodiment, each virtual client may have a script to run the emulated processes of a client. Every script may contain a single thread or a plurality of threads to run sub-processes of each virtual client. Threads of a script may be used to emulate and manage a plurality of callback objects. A callback object is a special type of transaction message which will be discussed in greater detail below.

A script may be filtered to remove the client operations, methods, or internal functions of the client device that do not affect communication with the server. The filtering of internal client operations from the script may remove user interface (UI) refreshes, graphical user interface (GUI) actions, and internal client system calls. Removing unwanted operations may be called black list filtering. The filtering of internal client operations may occur automatically at the time of recording the transaction, may occur later when a script is generated, or at other appropriate times (e.g., off-line filtering). A filter interface mechanism may be used to allow an end-user or software developer to define the set of classes and/or methods to capture during recording.

In another embodiment, transactions may filter out internal client operations, by only including operations, methods, or functions that are used in communication between the client device and the server. Filtering by only including wanted operations may be called white list filtering.

A callback is a special type of transaction or message which allows a server to asynchronously call a client device after the function, method, or object is registered by the client device. The registration of a callback may include using an interface through which the server may call or access the callback object. The interface may include a state variable used in the client application. The server may notify the client device through a callback when the value of a state variable changes.

Filtering a client callback object can differ from typical functions and methods because the object may be passed once to the client device and may be called asynchronously by the server when variable values change. The server may communicate with the device using the interface of the callback object. Filtering the callback object not only removes internal client operations but saves the resulting object as a virtual callback object and links the client callback interface used by the server to the virtual callback object, so the client callback interface references the virtual callback object in a callback.

Figure 3:
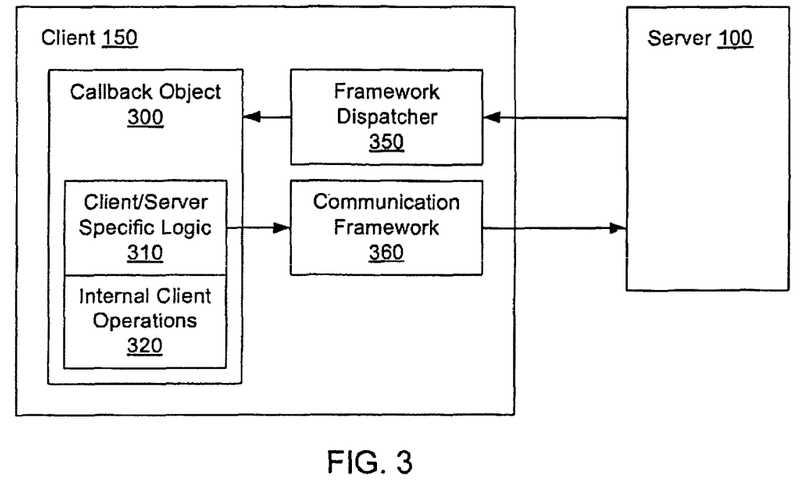
FIG. 3 is an illustration of a client callback object used by a client device and a server in accordance with an embodiment.

Referring to an embodiment of the implementation of a client callback object as illustrated in FIG. 3, the server 100 executes an application and communicates with a client device or client 150. A transaction may occur between the client device and server with the transaction including a client callback object or callback object 300. The client callback object may implement the callback interface (as defined by the service contract) and may further include function/methods to communicate with the server called client/server specific logic 310, and include function/methods internal to the client device called internal client operations 320.

The server may define the service contract and a callback interface. The service contract includes the relationship between the server and the client as it relates to the callback. The client device may register the callback interface so the client callback object 300 may be referenced or called later by the server. The client device may use a framework dispatcher to handle communication for both synchronous and asynchronous data coming from the server. The framework dispatcher 350 may be a standard entry point of communication returning from the server. The framework dispatcher may be used to capture data (e.g., as part of the recording module) sent from the server to the client. The client device may use a communications framework 360 to initiate communication with the server. The communications framework may also be used as part of the recording module to capture data sent from the client to the server.

The client callback object may include a plurality of functions/methods. The functions/methods can be further categorized as functions/methods that are only executed on the client device that do not impact communication with the server (internal client operations 320) and functions/methods impacting the communication with the server (client/server specific logic 310). A single function/method may also include both internal client operations, such as GUI updates, and operations impacting communication with the server.

The server may call the callback handler using the client callback interface asynchronously or whenever a call is necessitated. The client callback object may use a predefined callback mechanism supporting asynchronous calls from a support environment, such as .NET Remoting™, .NET Windows Communication Foundation (WCF) Duplex™ communication, and Java Messaging Service™ (JMS).

Figure 4:
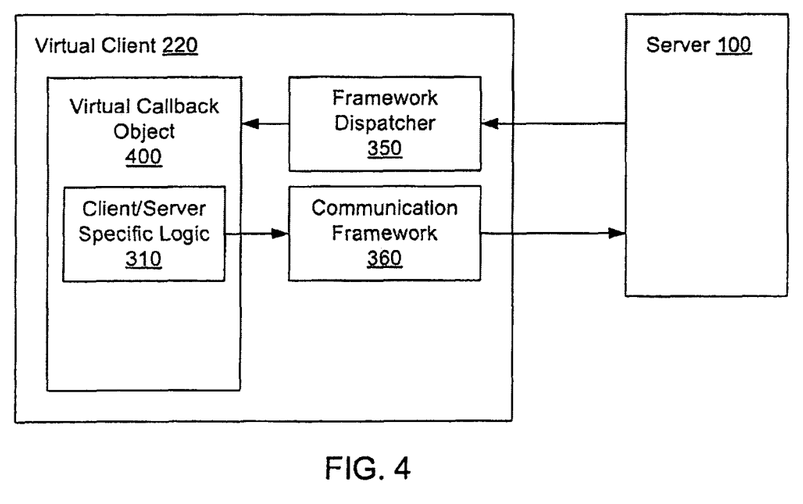
FIG. 4 is an illustration of a virtual callback object used by a virtual client and a server in accordance with an embodiment.

In an embodiment as illustrated in FIG. 4, an application executes using a virtual client 220 running on a client device or load server. A transaction may occur between the client device and server with the transaction including a callback object. The callback object exposed by the client (client callback object) may be replaced by a virtual callback object which uses the provided callback interface to reference the virtual callback object. The load testing mechanisms may provide the substitution of the callback object provided by the original client with the virtual callback object used by the virtual client. The data passed from the server to the virtual callback object may be saved for future use by the virtual client on the client device or load server. So, the virtual callback object, variables of the virtual callback object, or arguments of the virtual callback object may be used later by the script. The saved virtual callback object, variables of the virtual callback object, or arguments of the virtual callback object may be used by other virtual callback objects or methods/functions. The virtual callback object may include the client/server specific logic 310. The internal client operations 320 (as shown in FIG. 3) of the client callback object may be removed from the virtual callback object, so the consumed client device resources are minimized during load testing. The internal client operations may be removed during the recording of the transaction, the generation of the virtual client script, or in real-time during the replaying of the script on the virtual client. The virtual client may register the callback interface or similar virtual callback interface so the virtual callback object may be referenced or called later by the server. The virtual client may use a framework dispatcher and a communications framework to communicate with a server.

After the virtual callback object replaces the client callback object, the virtual client implements or executes the functions/methods of the virtual callback object or implements the application specific interface. The client callback object may include a plurality of functions/methods. When the server asynchronously calls the callback handler using the client callback interface or application specific interface, the virtual client callback object may be executed, instead of the client callback object.

The virtual callback object may also be called a dummy callback object because the dummy callback object may not operate like the original client callback object because the internal client operations may be missing. The virtual callback object may expose the original callback interface and may be passed to the service or virtual client instead of the original callback.

The virtual callback may include the storage of returned data, the performance of networking activity, and the synchronizing of the replay of the script. In one embodiment, when the server calls the callback object during replay, the virtual callback object may save the method arguments to data storage such as a key-value memory map. The virtual callback object may provide the client/server activity originating from the callback object. The virtual callback object may also provide an interface that can stop the script execution until a response or the next response arrives from the server. The script may include a synchronization call at the point that the callback occurred in the recording.

Some of the results of the system and method described are that manually writing dummy callbacks or virtual callbacks in the virtual client script may be eliminated. Manually writing dummy callbacks can require significant programming skills, knowledge of the specific application, and a considerable amount of time to implement. In addition, the filter mechanism may not have to be customized to record the original callback object, which includes the undesired local activity of the callback. Because applications are becoming more interactive and using asynchronous mechanisms, the automated method and system described can improve the quality of load testing by making an accurate and scalable load simulation for such complex environments. In addition, the speed at which load tests can be created is also increased, while the hardware used to execute the virtual clients is significantly reduced.

Figure 5:
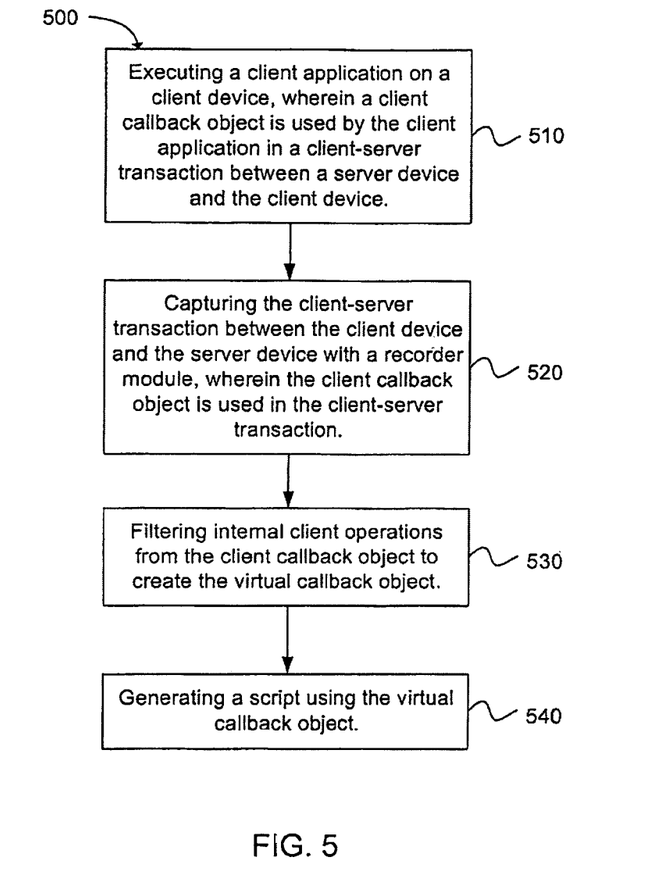
FIG. 5 is a flowchart illustrating a method for creating a virtual callback object using a client callback object in accordance with an embodiment.

Another embodiment provides a method 500 for creating a virtual callback object using a client callback object, as shown in the flow chart in FIG. 5. The method includes the operation of executing a client application on a client device 510. A client callback object is used by the client application in a client/server transaction between a server device and the client device. The operation of capturing the client/server transaction between the client device and the server device with a recorder module 520 follows. The client callback object is used in the client/server transaction.

The method further includes filtering internal client operations from the client callback object to create the virtual callback object 530. The next operation of the method may be generating a script using the virtual callback object 540.

To create a virtual callback object, communications may be analyzed for the entry point or first communication of a client callback object. For example, the internal or entry point using the .NET WCF Duplex™ communication support environment or infrastructure may use a private method, named "Invoke", of a class belonging to "System.ServiceModel.Dispatcher.SyncMethodInvoke". Invoke may be used to call the original callback object. By capturing internal methods used in a callback of a real user or client and analyzing the method's arguments, a callback method and its arguments can be identified. The filtering process may capture a method called f1. The captured f1 method may contain an inner call or second method called f2. Instead of ignoring the activity within the f1 method, rules may be used to record both the call to the f1 method and its resulting client activity and call to the f2 method and its resulting client activity.

Each callback may have a context, and all internal activity within the callback may be marked with the context. A stack per thread may be created to mark only the activity from that callback in the relevant context. More than one context may be present in different threads simultaneously and each context may be handled separately. The context may be used to handle callback activity individually and separately. The context can help to accurately generate the client callback in the virtual client script using in load simulation or load testing. Using captured information, the reflection application programming interface (API), and code generation mechanisms, scripts for virtual clients containing virtual callback objects may be created automatically.

Figure 6:
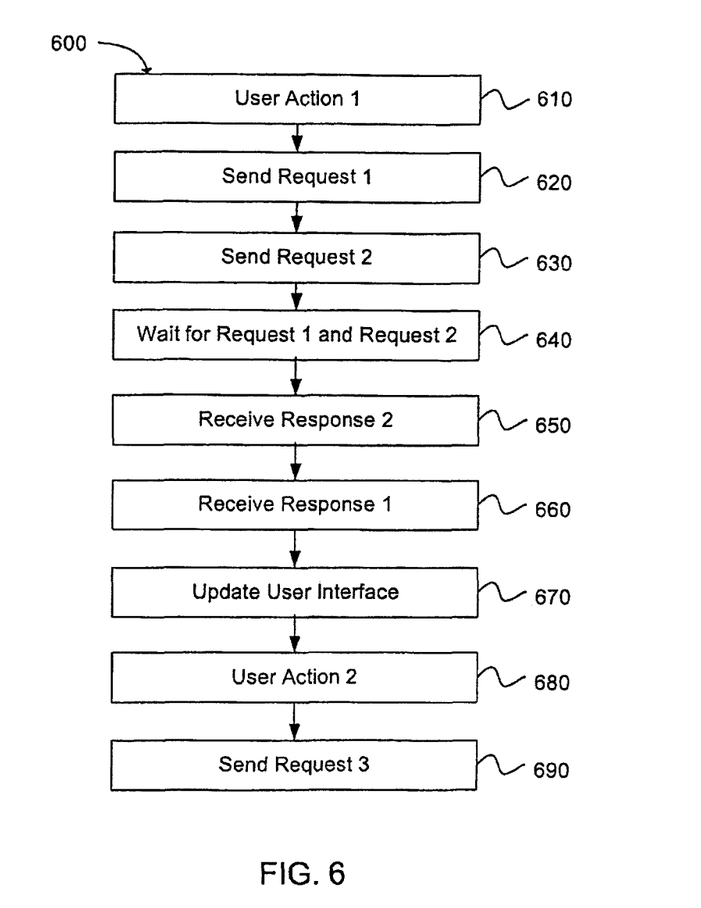
FIG. 6 is a flowchart illustrating asynchronous communication for a client device in communication with a server in accordance with an embodiment.

An embodiment of a communication flow 600 for a client device in communication with a server using a callback object is illustrated in FIG. 6. The client application may allow the user to perform a first operation on the client device called a user action 1 610 resulting in two requests being sent to the server. The requests may be called send request 1 620 and send request 2 630. Next, the client device may wait for response 1 and response 2 640. The client device may receive and process the responses from the two requests in any order. The responses to the requests may be generated by the server and handled/received by a waiting callback object. The responses may be called receive response 2 650, which is in response to request 2, and receive response 1 660, which is in response to request 1. The user interface may be updated 670 as a result of receiving both. Updating the user interface may refresh a display on the client that is viewable to a user. The user may perform a second action or user action 2 680. User action 2 may result in a third request being sent to the server. The third request may be called send request 3 690. The third request may use some of the data returned in receive response 1 and receive response 2.

Figure 7:
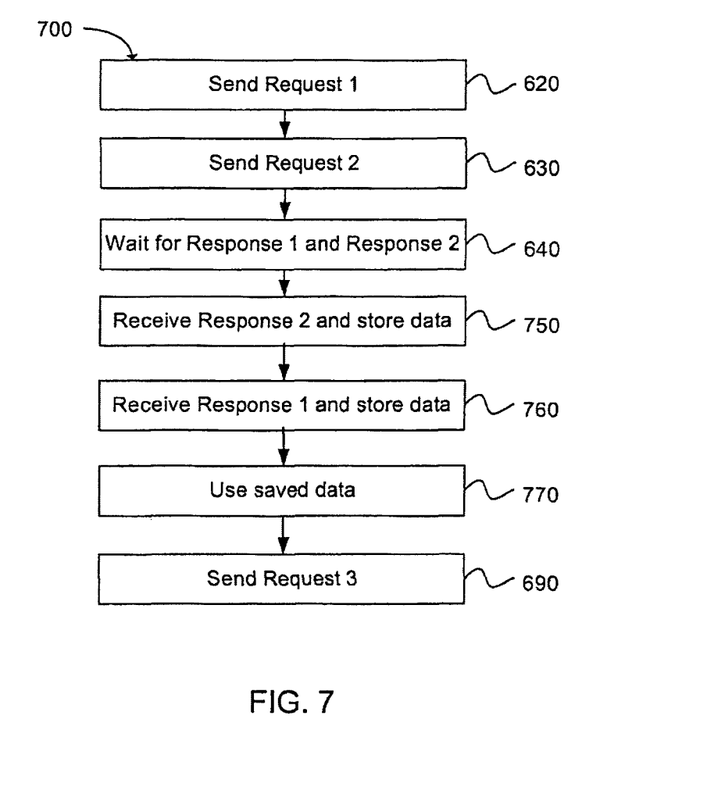
FIG. 7 is a flowchart illustrating asynchronous communication for a virtual client in communication with a server in accordance with an embodiment.

An embodiment of a communication flow 700 for a virtual client in communication with a server using a virtual callback object is illustrated in FIG. 7. A virtual client script or thread to a script may be used to emulate a user executing a client application. The script may generate two requests that are sent to the server. The user actions 610 and 680 of FIG. 6 may be eliminated from the virtual client process flow because the script performs the functions of the user. The requests may be called send request 1 620 and send request 2 630, and may be similar to the request 1 and request 2 of FIG. 6. The requests may simulate asynchronous requests to a server. Next, the virtual client may pause the script or thread to the script associated with request 1 and request 2 and wait for response 1 and response 2 640. The virtual client callback may receive and process the responses from the two requests in any order. The responses to the requests may be generated by the server and handled by the virtual client callback object. The data associated with the response to the requests may be saved by the virtual client callback object, which may be used in a later request or operation. The responses may be called receive response 2 and store data 750, which is in response to request 2, and receive response 1 and store data 760, which is in response to request 1. An step of using the saved data in the response from the server, which may be called use save data 770. Because the virtual client may not perform internal client operations, the update user interface 670 of FIG. 6 may be eliminated. After the response 1 and response 2 are received, the virtual script may generate a third request called send request 3 690. The third request may use some of the data returned in receive response 1 and receive response 2.

The method and system for creating a virtual callback object using a client callback object may be implemented using a computer readable medium having executable code embodied on the medium. The computer readable program code may be configured to provide the functions described in the method. The computer readable medium may be a RAM, ROM, EPROM, floppy disc, flash drive, optical drive, magnetic hard drive, or other medium for storing electronic data. Additionally, the method and system for creating a virtual callback object using a client callback object may be downloaded as a computer program product transferred from a server or remote computer to a requesting or client device by way of machine readable data signals embodied in a carrier wave or other propagation medium.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. A method for load testing a server comprising:
   executing a client application on a client device, wherein a client callback object is used by the client application in a transaction between the server and the client device;
   capturing the transaction with a recorder;
   filtering internal client operations from the client callback object to create a virtual callback object;
   generating a script, using the virtual callback object; and
   executing the script on a plurality of virtual clients in the client device, wherein executing the script comprises pausing a thread of the script when the virtual callback object is used until all desired responses to the virtual callback object are received from the server, wherein the thread emulates one or more of the virtual clients.

2. The method of claim 1, wherein capturing the transaction further comprises registering a client callback object interface on the client device.

3. The method of claim 2, wherein the client callback interfaces references the virtual callback object in a callback.

4. The method of claim 1, wherein executing the script on a plurality of virtual clients comprises using a client callback object interface to perform the activity of the virtual callback object.

5. The method of claim 1, wherein executing the script on a plurality of virtual clients comprises storing method arguments of the client callback object to a data storage.

6. The method of claim 1, wherein filtering internal client operations from the client callback object to create the virtual callback object removes user interface (UI) refreshes, graphical user interface (GUI) actions, and client system calls.

7. The method of claim 1, wherein the virtual callback object includes client/server specific logic and client/server communication operations.

8. A system for creating a virtual callback object using a client callback object, comprising:
   a client application using the client callback object;
   a server to service the client application;
   a client device in communication with the server, the client device to:
      receive the client callback object from the server; and
      execute a script on a plurality of virtual clients in the client device, wherein executing the script comprises pausing a thread of the script when the virtual callback object is used until all desired responses to the virtual callback object are received from the server, wherein the thread emulates one or more of the virtual clients; and
   a recorder to capture a transaction between the client device and the server, wherein the transaction includes the client callback object, and the recorder is to filter the client callback object of internal client operations to generate the virtual callback object.

9. The system of claim 8, further comprising a load server connected to the server, the load server to run a plurality of virtual clients and each virtual client to run a thread of the script.

10. The system of claim 8 wherein the internal client operations comprise user interface (UI) refreshes, graphical user interface (GUI) actions, and client system calls.

11. A machine readable storage medium comprising machine readable instructions, which instructions, when executed, cause a machine to at least:
   capture a transaction between a server and a client with a recorder, a client callback object being used by a client application in the transaction;
   filter internal client operations from the client callback object to create a virtual callback object; and
   generate a script using the virtual callback object; and
   execute a script on a plurality of virtual clients in the client device, wherein executing the script comprises pausing a thread of the script when the virtual callback object is used until all desired responses to the virtual callback object are received from the server, wherein the thread emulates one or more of the virtual clients.

12. The machine readable storage medium of claim 11 wherein the machine readable instructions, when executed, cause the machine to:
   register a client callback object interface on the client.

13. The machine readable storage medium of claim 11 wherein the client callback interface references the virtual callback object in a callback.

14. The machine readable storage medium of claim 11 wherein the internal client operations comprise user interface (UI) refreshes, graphical user interface (GUI) actions, and client system calls.

* * * * *